United States Patent [19]
Tsuji et al.

[11] Patent Number: 5,286,048
[45] Date of Patent: Feb. 15, 1994

[54] SUSPENSION SYSTEM FOR DIRIGIBLE REAR WHEELS

[75] Inventors: Kouji Tsuji; Takeshi Edahiro, both of Hiroshima, Japan

[73] Assignee: Mazda Motor Corporation, Hiroshima, Japan

[21] Appl. No.: 933,652

[22] Filed: Aug. 24, 1992

[30] Foreign Application Priority Data

Aug. 30, 1991 [JP] Japan ................................ 3-219669

[51] Int. Cl.$^5$ .......................................... B60G 3/00
[52] U.S. Cl. ................................ 280/91; 280/675; 280/691
[58] Field of Search .............. 280/675, 673, 696, 701, 280/693, 691, 690, 91

[56] References Cited

U.S. PATENT DOCUMENTS

| | | | |
|---|---|---|---|
| 4,511,160 | 4/1985 | Inoue | 280/696 X |
| 4,863,188 | 9/1989 | Killian | 280/675 |
| 4,978,131 | 12/1990 | Edahiro et al. | 280/675 X |
| 5,048,860 | 9/1991 | Kanai et al. | 280/675 X |

FOREIGN PATENT DOCUMENTS

| | | |
|---|---|---|
| 38-31880 | 2/1963 | Japan . |
| 62-152977 | 7/1987 | Japan . |
| 3-276804 | 12/1991 | Japan | 280/691 |

*Primary Examiner*—Margaret A. Focarino
*Assistant Examiner*—Peter English
*Attorney, Agent, or Firm*—Sixbey, Friedman, Leedom & Ferguson

[57] ABSTRACT

A rear suspension system for supporting dirigible rear wheels of a vehicle consists of left and right rear suspensions each of which includes first and second links which are connected for rotation to the rear wheel support in different positions at their outer ends and to the vehicle body in different positions at their inner ends and a damper which is connected to the vehicle body at its upper end and to the first links at its lower end. The dampers of the left and right rear suspensions are inclined to the corresponding first links so that they transmits force to the first links to generate moments about instantaneous centers of turn of the respective rear wheel supports. The moments are substantially equal to each other and are directed in opposite directions when the rear wheels are held in the straight ahead position. The first and second links are arranged so that the sum of the moments becomes positive as the rear wheels are turned when a moment in the direction of turn of the rear wheels is defined to be positive and a moment in the reverse direction is defined to be negative.

9 Claims, 8 Drawing Sheets

SUSPENSION SYSTEM FOR DIRIGIBLE REAR WHEELS

BACKGROUND OF THE INVENTION

1. Field of the Invention

This invention relates to a suspension system for dirigible rear wheels, and more particularly to a rear suspension system for a vehicle in which the rear wheels are dirigible.

2. Description of the Prior Art

There has been known a four-wheel steered vehicle in which the rear wheels are turned in response to turning of the front wheels. When the front wheel turning system and the rear wheel turning system are mechanically connected, the effort required to turn the steering wheel is larger than when only the front wheels are turned in response to turning of the steering wheel.

Generally such a four-wheel steered vehicle is provided with a centering spring mechanism as disclosed, for instance, in Japanese Unexamined Patent Publication No. 63(1988)31880. The centering spring mechanism is provided on a relay rod which connects the left and right rear wheels and is displaced in the transverse direction of the vehicle body to turn the rear wheels, and, in case of failure in the control system of the rear wheel turning system, the force which is transmitted to the relay rods to turn the rear wheels is released and the relay rod is returned to the neutral position, where the rear wheels are held in the straight ahead position, and held there by the centering mechanism. Accordingly, normally the relay rod must be displaced to turn the rear wheels overcoming the force of the centering spring mechanism, which further adds to the effort required to turn the steering wheel.

In the case where a power cylinder mechanism is provided to assist in displacement of the relay rod, the power cylinder mechanism must be large in order to overcome the force of the centering spring mechanism, which adds to the overall size of the rear wheel turning mechanism and complicates the structure of the same.

SUMMARY OF THE INVENTION

In view of the foregoing observations and description, the primary object of the present invention is to provide a rear suspension system which supports dirigible rear wheels of, for instance, a four-wheel steered vehicle so that the rear wheels can be turned with a relatively small force.

A rear suspension system of the present invention consists of left and right rear suspensions each of which comprises first and second links which are connected for rotation to the rear wheel support in different positions at their outer ends and to the vehicle body in different positions at their inner ends and a damper which is connected to the vehicle body at its upper end and to the first links at its lower end. The dampers of the left and right rear suspensions are inclined to the corresponding first links so that they transmit force to the first links to generate moments about instantaneous centers of turn of the respective rear wheel supports. The moments are substantially equal to each other and are directed in opposite directions when the rear wheels are held in the straight ahead position. The first and second links are arranged so that the sum of the moments becomes positive as the rear wheels are turned when a moment in the direction of turn of the rear wheels is defined to be positive and a moment in the reverse direction is defined to be negative.

When the sum of the moments becomes positive as the rear wheels are turned, that is, when the moment in the direction of turn of the rear wheels becomes larger than that in the reverse direction, the rear wheel turning mechanism can be assisted in turning the rear wheels.

In one preferred embodiment of the present invention, the first link extends substantially in the transverse direction of the vehicle body, the damper is inclined rearward so that the lower end thereof is positioned forward of the upper end thereof and the outer end of the first link at which the first link is connected to the wheel support is positioned outward of said instantaneous center in each of the left and right rear suspensions. With this arrangement, an inward moment is generated about the instantaneous center under the force transmitted to the first link from the damper. Further, in each of the left and right rear suspensions, the links are arranged so that the instantaneous center moves leftward when the rear wheels are turned left and rightward when the rear wheels are turned right. With this arrangement, the distance between the outer end of the first link and the instantaneous center increases in the rear suspension for the outer wheel and decreases in the rear suspension for the inner wheel when the rear wheels are turned. The magnitude of the moment about the instantaneous center increases as the distance between the outer end of the first link (i.e., the connection of the first link to the rear wheel support) and the instantaneous center increases, and accordingly, the moment in the direction of the turn of the rear wheels becomes larger than that in the reverse direction and the sum of the moments becomes positive as the rear wheels are turned.

In another preferred embodiment of the present invention, the first link extends substantially in the transverse direction of the vehicle body, the damper is inclined rearward so that the lower end thereof is positioned forward of the upper end thereof and said outer end of the first link at which the first link is connected to the wheel support is positioned inward of said instantaneous center in each of the left and right rear suspensions. With this arrangment, an outward moment is generated about the instantaneous center under the force transmitted to the first link from the damper. Further, in each of the left and right rear suspensions, the links are arranged so that the instantaneous center moves leftward when the rear wheels are turned left and rightward when the rear wheels are turned right. With this arrangement, the distance between the outer end of the first link and the instantaneous center decreases in the rear suspension for the outer wheel and increases in the rear suspension for the inner wheel when the rear wheels are turned. Accordingly the moment in the direction of the turn of the rear wheels becomes larger than that in the reverse direction and the sum of the moments becomes positive as the rear wheels are turned.

In still another preferred embodiment of the present invention, the first link extends substantially in the transverse direction of the vehicle body, the damper is inclined forward so that the lower end thereof is positioned rearward of the upper end thereof and the outer end of the first link at which the first link is connected to the wheel support is positioned outward of said instantaneous center in each of the left and right rear suspensions. With this arrangement, an outward moment is generated about the instantaneous center under the force transmitted to the first link from the damper. Further in each of the left and right rear suspensions, the links are arranged so that the instantaneous center moves rightward when the rear wheels are turned left and leftward when the rear wheels are turned right. With this arrangement, the distance between the outer end of the first link and the instantaneous center decreases in the rear suspension for the outer wheel and increases in the rear suspension for the inner wheel when the rear wheels are turned. Accordingly the moment in the direction of the turn of the rear wheels becomes larger than that in the reverse direction and the sum of the moments becomes positive as the rear wheels are turned.

In the preferred embodiments of the present invention described above, the moment in the direction of turn of the rear wheels increases and the moment in the reverse direction decreases as the turning angle of the rear wheels increases. This is especially preferable when the rear suspension system is applied to the rear wheel turning mechanism having a centering spring mechanism the counterforce of which increases as the turning angle of the rear wheels increases.

The force transmitted to the first link from the damper may be any force though it is typically a counterforce of a spring of the damper.

The term "instantaneous center of turn of the rear wheel support" means the center of turn of the rear wheel support which moves as the rear wheel is turned and is generally on the imaginary king pin axis of the rear wheel.

DESCRIPTION OF THE PREFERRED EMBODIMENTS

An example of a vehicle to which the rear suspension system in accordance with the present invention can be suitably applied will be first described with reference to FIG. 1, hereinbelow.

Figure 1:
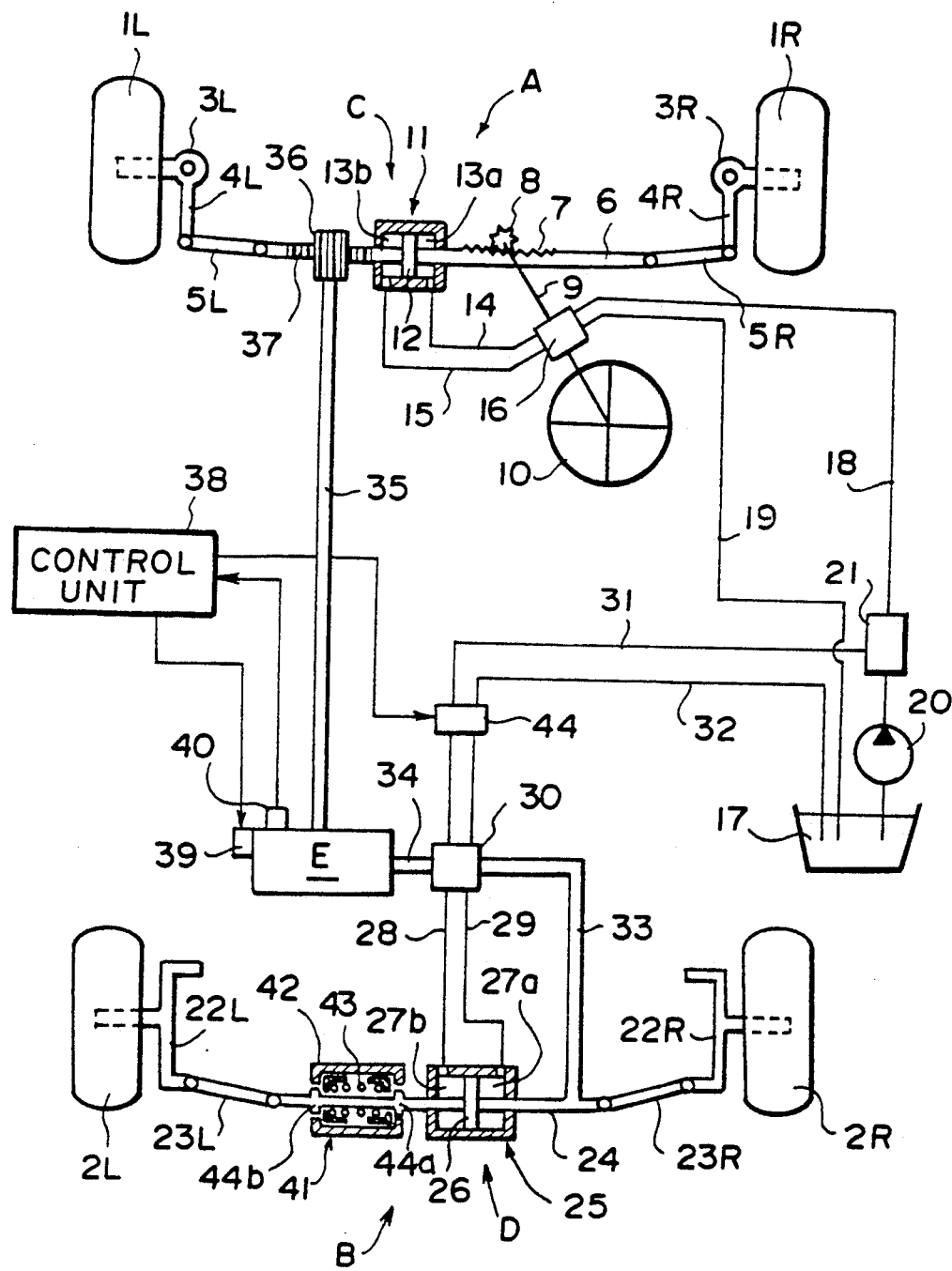
FIG. 1 is a schematic plan view showing an example of a vehicle to which the rear suspension system in accordance with the present invention can be suitably applied.

The vehicle shown in FIG. 1 has left and right front wheels 1L and 1R and left and right rear wheels 2L and 2R. The front and rear wheels are turned by a four-wheel steering system in response to turning of a steering wheel 10. The four-wheel steering system comprises a front wheel turning mechanism A and a rear wheel turning mechanism B.

The front wheel turning mechanism A comprises left and right knuckle arms 4L and 4R connected to left and right front wheel supports 3L and 3R which support the left and right front wheels 1L and 1R for rotation, left and right tie rods 5L and 5R which are connected for rotation respectively to the left and right knuckle arms 4L and 4R, and a relay rod 6 which connects the tie rods 5L and 5R. A rack 7 is provided on the relay rod 6 and a pinion 8 on the lower end of a steering shaft 9 is in mesh with the rack 7. The front wheel turning mechanism A is further provided with a front power steering system C.

The front power steering system C has a power cylinder 11 provided on the relay rod 6 and the inner space of the cylinder 11 is divided into a pair of pressure chambers 13a and 13b by a partition wall 12 fixed to the relay rod 6. The pressure chambers 13a and 13b are connected to a control valve 16 on the steering shaft 9 by way of pressure lines 14 and 15. Pressure lines 18 and 19 extend between the control valve 16 and an oil reservoir 17. An oil pump 20 driven by an engine (not shown) and a distributor valve 21 are provided in the pressure line 18.

Since the operation of the power steering system C is well known, it will not be described here.

The rear wheel turning mechanism B comprises left and right tie rods 23L and 23R connected for rotation to left and right rear wheel supports 22L and 22R which support the left and right rear wheels 2L and 2R for rotation, and a relay rod 24 which connects the tie rods 23L and 23R. The rear wheel turning mechanism B is provided with a rear power steering system D.

The rear power steering system D has a power cylinder 25 provided on the relay rod 24 and the inner space of the cylinder 25 is divided into a pair of pressure chambers 27a and 27b by a partition wall 26 fixed to the relay rod 24. The pressure chambers 27a and 27b are connected to a control valve 30 by way of pressure lines 28 and 29.

A control rod 33 which extends from the control valve 30 is integrally connected to the relay rod 24. The control rod 33 is connected to an output shaft 34 of a rear wheel turning ratio changing mechanism E in the control valve 30. An input rod 35 connected to the relay rod 6 of the front wheel turning mechanism A by way of a rack 37 and a pinion 36 transmits the amount of movement of the relay rod 6 or the turning angle of the steering wheel 10 to the rear wheel turning ratio changing mechanism E. Thus the front and rear wheel turning mechanisms A and B are connected by way of the rear wheel turning ratio changing mechanism E. The rear wheel turning angle ratio changing mechanism E is for changing the ratio of the rear wheel turning angle to the front wheel turning angle and is well known in the art as described, for instance, in Japanese Unexamined Patent Publication No. 62(1987)-152977, and accordingly will not be described in more detail here.

A control unit 38 controls a motor 39, thereby controlling the rear wheel turning ratio changing mechanism E so that the ratio of the rear wheel turning angle to the front wheel turning angle (rear wheel turning ratio) becomes a predetermined value. That is, the output rod 34 is moved left or right in response to rotation of the input rod 35 which represents the direction and angle of turning of the front wheels, and the amount of movement of the output rod 34 for a given angle of rotation of the input rod 35 which corresponds to the rear wheel turning ratio is changed by driving the motor 39. In response to the movement of the output rod 34, the control rod 33 is displaced left or right to displace the relay rod 24 in the same direction, thereby turning the rear wheels. Hydraulic pressure is selectively applied to one of the pressure chambers 27a and 27b according to the direction of the displacement of the control rod 33, and the hydraulic pressure applied to said one pressure chamber assists the control rod 33 in displacing the relay rod 24. Reference numeral 40 in FIG. 1 denotes a rear wheel turning ratio sensor which detects the actual rear wheel turning ratio, and the control unit 38 feedback-controls the motor 39 on the basis of the output of the sensor 40.

The rear wheel turning mechanism B is further provided with a centering spring mechanism 41 for urging the relay rod 24 to the neutral position where the relay rod 24 holds the rear wheels in the straight ahead position. The centering spring mechanism 41 comprises a coil spring 43 compressed in a casing 42 fixed to the vehicle body. The relay rod 24 extends through the coil spring 43 with a pair of stoppers 44a and 44b integrally formed thereon abutting against opposite end faces of the spring 43 so that when the relay rod 24 is displaced rightward from the neutral position, the coil spring 43 exerts a leftward force and when the relay rod 24 is displaced leftward from the neutral position, the coil spring 43 exerts a rightward force. Accordingly, the centering spring mechanism 41 adds to the power requirement for the power cylinder 25.

In the case of failure in the rear wheel turning mechanism B, the control unit 38 actuates a fail-safe valve 44 in the pressure lines 31 and 32 to release the hydraulic pressure in the pressure chambers 27a or 27b of the power cylinder 25, whereby the relay rod 24 is returned to the neutral position under the force of the centering spring mechanism 41.

Figure 2:
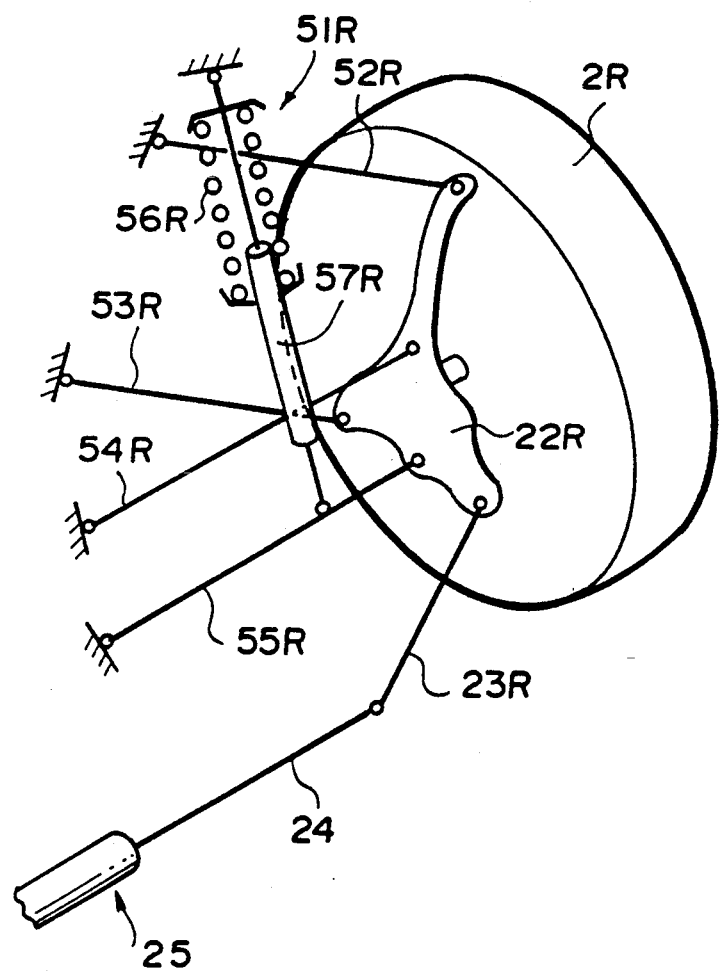
FIG. 2 is a perspective view showing a part of a rear suspension system in accordance with an embodiment of the present invention.

FIG. 2 shows a rear suspension in accordance with an embodiment of the present invention. The rear suspension is for supporting the right rear wheel 2R of the four-wheel steered vehicle shown in FIG. 1.

The rear suspension comprises four links, upper and lower trailing links 52R and 53R and upper and lower lateral links 54R and 55R, the tie rod 23R and a damper 51R. The upper trailing link 52R extends in the longitudinal direction of the vehicle body and is supported for rotation on an upper portion of the rear wheel support 22R at one end and on the vehicle body at the other end. The lower trailing link 53R extends in the longitudinal direction of the vehicle body and is supported for rotation on a lower portion of the rear wheel support 22R at one end and on the vehicle body at the other end. The upper lateral link 54R extends in the transverse direction of the vehicle body and is supported for rotation on an intermediate portion of the rear wheel support 22R at one end and on the vehicle body at the other end. The lower lateral link 55R extends in the transverse direction of the vehicle body and is supported for rotation on a lower portion of the rear wheel support 22R at one end and on the vehicle body at the other end.

Displacements of the rear wheel support 22R and the right rear wheel 2R in the vertical direction, the longitudinal direction and the transverse direction of the vehicle body are limited by the four links 52R, 53R, 54R and 55R and the tie rod 23R, and the rear wheel support 22R and the right rear wheel 2R are turned about the instantaneous center of turn described above in response to displacement of the relay rod 24.

The damper 51R may be of a known structure and comprises a coil spring 56R and a shock absorber 57R which extends through the coil spring 56R. The damper 51R is connected to the vehicle body at its upper end and to the lower lateral link 55R at its lower end and is inclined with respect to the lower lateral link 55R.

The object of the present invention can be accomplished mainly by the relative positions of the lower trailing link 53R, the lower lateral link 55R, the tie rod 23R and the damper 51R, and accordingly, the operation of the rear suspension of this embodiment will be described with reference to the drawings which schematically shows the relative positions of these members, hereinbelow.

Figure 3:
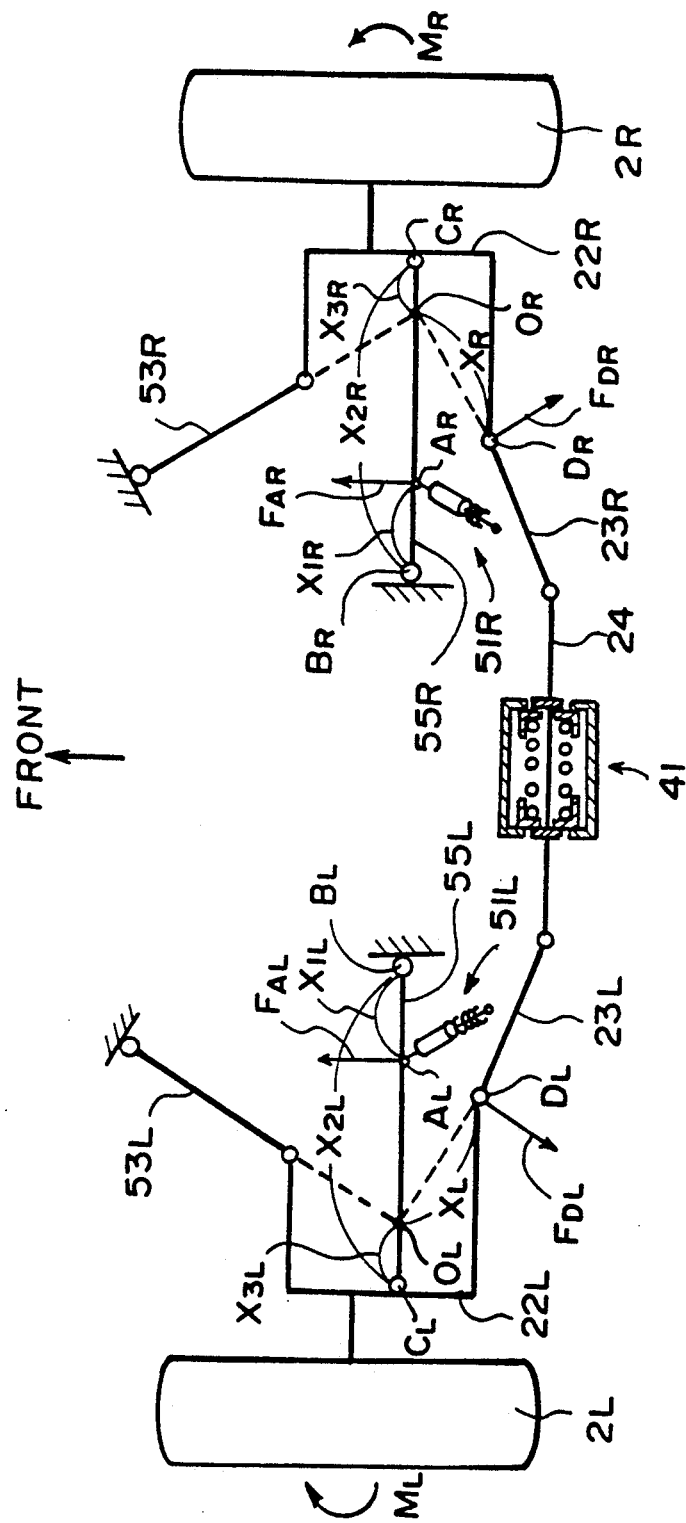
FIG. 3 is a schematic view showing the rear suspension system of the embodiment in a state where the rear wheels are held in the straight ahead position.
Figure 4:
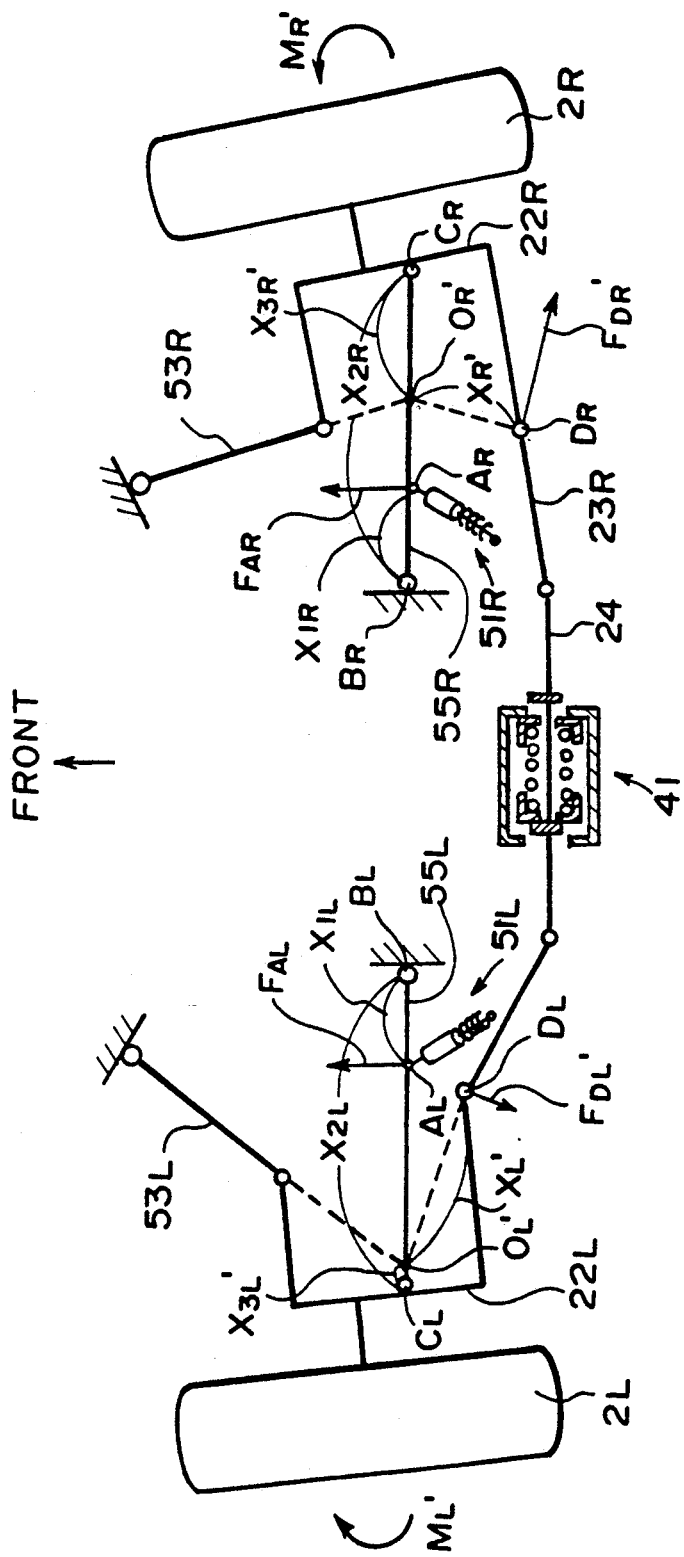
FIG. 4 is a schematic view showing the same but in a state where the rear wheels are turned left.

FIG. 3 shows the left and right rear suspensions in the state where the left and right rear wheels 2L and 2R are held in the straight ahead position and FIG. 4 shows the same in a sate where the rear wheels 2L and 2R are turned left. The right rear suspension is the same as that shown in FIG. 2 and the left rear suspension is the same as the right rear suspension in structure except that the components are arranged symmetrically to those in the right rear suspension. The components in the left rear suspension are denoted by reference numerals obtained by replacing "R" of the reference numerals denoting the corresponding components of the right rear suspension with "L" and will not be described here.

As shown in FIG. 3, in the right rear suspension, the lower trailing link 53R and the lower lateral link 55R as well as the tie rod 23R are connected to the wheel support 22R, and the lower end of the damper 51R is connected to the lower lateral link 55R. The damper 51R is inclined with respect to the lower lateral link 55R so that the upper end thereof is positioned rearward of the lower end thereof. Similarly in the left rear suspension, the lower trailing link 53L and the lower lateral link 55L as well as the tie rod 23L are connected to the wheel support 22R, and the lower end of the damper 51L is connected to the lower lateral link 55L. The damper 51L is inclined with respect to the lower lateral link 55L so that the upper end thereof is positioned rearward of the lower end thereof. The left and right tie rods 23L and 23R are connected by the relay rod 24 which is provided with the centering spring mechanism 41. The power steering mechanism D and the like are omitted for the purpose of simplicity.

With reference to FIG. 3, the instantaneous center of turn of the right rear wheel 2R or the right wheel support 22R (will be referred to as "the right instantaneous center, hereinbelow) about which the right rear wheel 2R and the right wheel support 22R are turned in response to displacement of the relay rod 24 is always on the intersection of the lower trailing link 53R and the lower lateral link 55R. In FIG. 3, $O_R$ denotes the right instantaneous center when the rear wheels are in the straight ahead position. Similarly, the instantaneous center of turn of the left rear wheel 2L or the left wheel support 22L (will be referred to as "the left instantaneous center, hereinbelow) about which the left rear wheel 2L and the left wheel support 22L are turned in response to displacement of the relay rod 24 is always on the intersection of the lower trailing link 53L and the lower lateral link 55L. In FIG. 3, $O_L$ denotes the left instantaneous center when the rear wheels are in the straight ahead position.

A counterforce of the coil spring 56R of the right damper 51R acts on the lower lateral link 55R at the connection $A_R$ of the right damper 51R to the lower lateral link 55R. When the component of the counterforce toward the front of the vehicle body (the component normal to the lower lateral link 55R and directed toward the front of the vehicle body along the paper surface in FIG. 3) is represented by $F_{AR}$, the distance between the connection $B_R$ of the lower lateral link 55R to the vehicle body and the connection $A_R$ of the right damper 51R to the lower lateral link 55R is represented by $X_{1R}$ and the distance between the connection $C_R$ of the lower lateral link 55R to the wheel support 22R and the connection $B_R$ is represented by $X_{2R}$, the moment acting on the lower lateral link 55R about the connection $B_R$ under the force $F_{AR}$ can be expressed as $F_{AR} \times X_{1R}$. Accordingly, the force acting on the wheel support 22R at the connection $C_R$ can be expressed as $F_{AR} \times X_{1R}/X_{2R}$. Accordingly, the moment $M_R$ acting on the rear wheel support 22R about the right instantaneous center $O_R$ under the force $F_{AR}$ can be represented by the following formula.

$$M_R = (F_{AR} \times X_{1R}/X_{2R}) \times X_{3R} \tag{1}$$

wherein $X_{3R}$ represents the distance between the right instantaneous center $O_R$ and the connection $C_R$.

The moment $M_R$ represented by formula (1) acts to turn the right rear wheel 2R inward, i.e., leftward.

Similarly, a counterforce of the coil spring 56L of the left damper 51L of the left damper 51L to the lower at the connection $A_L$ of the left damper 51L to the lower lateral link 55L. When the component of the counterforce toward the front of the vehicle body (the component normal to the lower lateral link 55L and directed toward the front of the vehicle body along the paper surface in FIG. 3) is represented by $F_{AL}$, the distance between the connection $B_L$ of the lower lateral link 55L to the vehicle body and the connection $A_L$ of the right damper 51L to the lower lateral link 51L is represented by $X_{1L}$ and the distance between the connection $C_L$ of the lower lateral link 55L to the wheel support 22L and the connection $B_L$ is represented by $X_{2L}$, the moment acting on the lower lateral link 55L about the connection $B_L$ under the force $F_{AL}$ can be expressed as $F_{AL} \times X_{1L}$. Accordingly, the force acting on the wheel support 22L at the connection $C_L$ can be expressed as $F_{AL} \times X_{1L}/X_{2L}$. Accordingly, the moment $M_L$ acting on the rear wheel support 22L about the left instantaneous center $O_L$ under the force $F_{AL}$ can be represented by the following formula.

$$M_L = (F_{AL} \times X_{1L}/X_{2L}) \times X_{3L} \tag{2}$$

wherein $X_{3L}$ represents the distance between the left instantaneous center $O_L$ and the connection $C_L$.

The moment $M_L$ represented by formula (2) acts to turn the left rear wheel 2L inward, i.e., rightward.

Since the left and right rear suspensions are symmetrical to each other when the left and right rear wheels 2L and 2R are in the straight ahead position, the inward moments $M_L$ and $M_R$ are equal to each other in force and are directed in opposite directions so long as the forces $F_{AL}$ and $F_{AR}$ are equal to each other.

As the left and right rear wheels 2L and 2R are turned left compressing the spring 43 rightward as shown in FIG. 4, the left and right instantaneous centers move leftward along the left and right lower lateral links 55L and 55R. On the side of the right rear wheel 2R which is the outer wheel, the distance between the connection $C_R$ of the lower lateral link 55R to the wheel support 22R and the right instantaneous center ($O_R \rightarrow O_R'$) increases ($X_{3R} \rightarrow X_{3R}'$) and on the side of the left rear wheel 2L which is the inner wheel, the distance between the connection $C_L$ of the lower lateral link 55L to the wheel support 22L and the left instantaneous center ($O_L \rightarrow O_L'$) decreases ($X_{3L} \rightarrow X_{3L}'$).

In the state shown in FIG. 4, the moment $M_R'$ acting on the rear wheel support 22R about the right instantaneous center $O_R'$ under the force $F_{AR}$ can be represented by the following formula.

$$M_R' = (F_{AR} \times X_{1R}/X_{2R}) \times X_{3R}' \tag{3}$$

wherein $X_{3R}'$ represents the distance between the right instantaneous center $O_R'$ and the connection $C_R$.

Similarly the moment $M_L'$ acting on the rear wheel support 22L about the left instantaneous center $O_L'$ under the force $F_{AL}$ can be represented by the following formula.

$$M_L' = (F_{AR} \times X_{1L}/X_{2L}) \times X_{3L}' \tag{4}$$

wherein $X_{3L}'$ represents the distance between the left instantaneous center $O_L'$ and the connection $C_L$.

Since the distance $X_{3R}'$ is larger than the distance $X_{3R}$, the moment $M_R'$ when the rear wheels are in the turned state is larger than the moment $M_R$ when the rear wheels are in the straight ahead position. On the other hand, since the distance $X_{3L}'$ s smaller than the distance $X_{3L}$, the moment $M_L'$ when the rear wheels are in the turned stated is smaller than the moment $M_L$ when the rear wheels are in the straight ahead position. Since the moment $M_R$ is equal to the moment $M_L$, the moment $M_R'$ is larger than the moment $M_L'$. When the moment in the direction of turn of the rear wheels is defined to be positive and the moment in the reverse direction is defined to be negative, the sum of the moments $M_R'$ and $M_L'$ is positive.

Since the left and right wheel supports 22L and 22R are connected by way of the tie rods 23L and 23R and the relay rod 24, when the sum of the moments $M_R'$ and $M_L'$ is positive, that is, when the moment $M_R'$ which tends to turn the rear wheel leftward is larger than the moment $M_L'$ which tends to turn the rear wheel rightward, a force directed rightward acts on the relay rod 24 and assists the rear wheel turning mechanism B in turning the rear wheels leftward, thereby reducing the force required to turn the rear wheels.

The value obtained by dividing the moment $M_R$ by the distance $X_R$ between the right instantaneous center $O_R$ and the connection $D_R$ of the wheel support 22R to the tie rod 23R corresponds to the magnitude of the force $F_{DR}$ which acts, under the moment $M_R$, on the tie rod 23R at the connection $D_R$ in the direction normal to the line joining the right instantaneous center $O_R$ and the line connection $D_R$. That is, the force $F_{DR}$ is represented by the following formula.

$$F_{DR} = M_R/X_R \tag{5}$$

Similarly the force $F_{DL}$ which acts, under the moment $M_L$, on the tie rod 23L at the connection $D_L$ in the direction normal to the line joining the left instantaneous center $O_L$ and the connection $D_L$ is represented by the following formula.

$$F_{DL} = M_L / X_L \tag{6}$$

wherein $X_L$ represents the distance between the left instantaneous center $O_L$ and the connection $D_L$ of the wheel support 22L to the tie rod 23L.

The component of the force $F_{DR}$ in the axial direction of the relay rod 24 acts to compress rightward the coil spring 43 of the centering spring mechanism 41, and the component of the force $F_{DL}$ in the axial direction of the relay rod 24 acts to compress leftward the coil spring 43. In the state shown in FIG. 3, the forces $F_{DR}$ and $F_{DL}$ balance with each other.

In the state shown in FIG. 4, the force $F_{DR}'$ which acts, under the moment $M_R'$, on the tie rod 23R at the connection $D_R$ in the direction normal to the line joining the instantaneous center $O_R'$ and the connection $D_R$ is represented by the following formula.

$$F_{DR}' = M_R' / X_R' \tag{7}$$

wherein $X_R'$ represents the distance between the instantaneous center $O_R'$ and the connection $D_R$. The force $F_{DL}'$ which acts, under the moment $M_L'$, on the tie rod 23L at the connection $D_L$ in the direction normal to the line joining the instantaneous center $O_L'$ and the connection $D_L$ is represented by the following formula.

$$F_{DL}' = M_L' / X_L' \tag{8}$$

wherein $X_L'$ represents the distance between the instantaneous center $O_L'$ and the connection $D_L$.

Since $X_R$ is larger than $X_R'$ and $M_R$ is smaller than $M_R'$, $F_{DR}'$ is larger than $F_{DR}$. Further since Since $X_L$ is smaller than $X_L'$ and $M_L$ is larger than $M_L'$, $F_{DL}'$ is smaller than $F_{DL}$. Accordingly, $F_{DL}'$ is smaller than $F_{DR}'$. Further as can be understood from FIG. 4, the component of the force $F_{DR}'$ in the axial direction of the relay rod 24 to compress rightward the coil spring 43 is larger than the component of the force $F_{DL}'$ in the axial direction of the relay rod 24 to compress leftward the coil spring 43. Thus a force which assists the rear wheel turning mechanism B in turning the rear wheels leftward acts on the relay rod 24.

In the similar manner, a force which assists the rear wheel turning mechanism B in turning the rear wheels rightward acts on the relay rod 24 when the rear wheel turning mechanism B turns the rear wheels rightward.

Actually the left and right lower lateral links 55L and 55R slightly rotate respectively about the connections $B_L$ and $B_R$ thereof to the vehicle body. However since the influence of such movements is negligible, it is not described in the description above.

Figure 5:
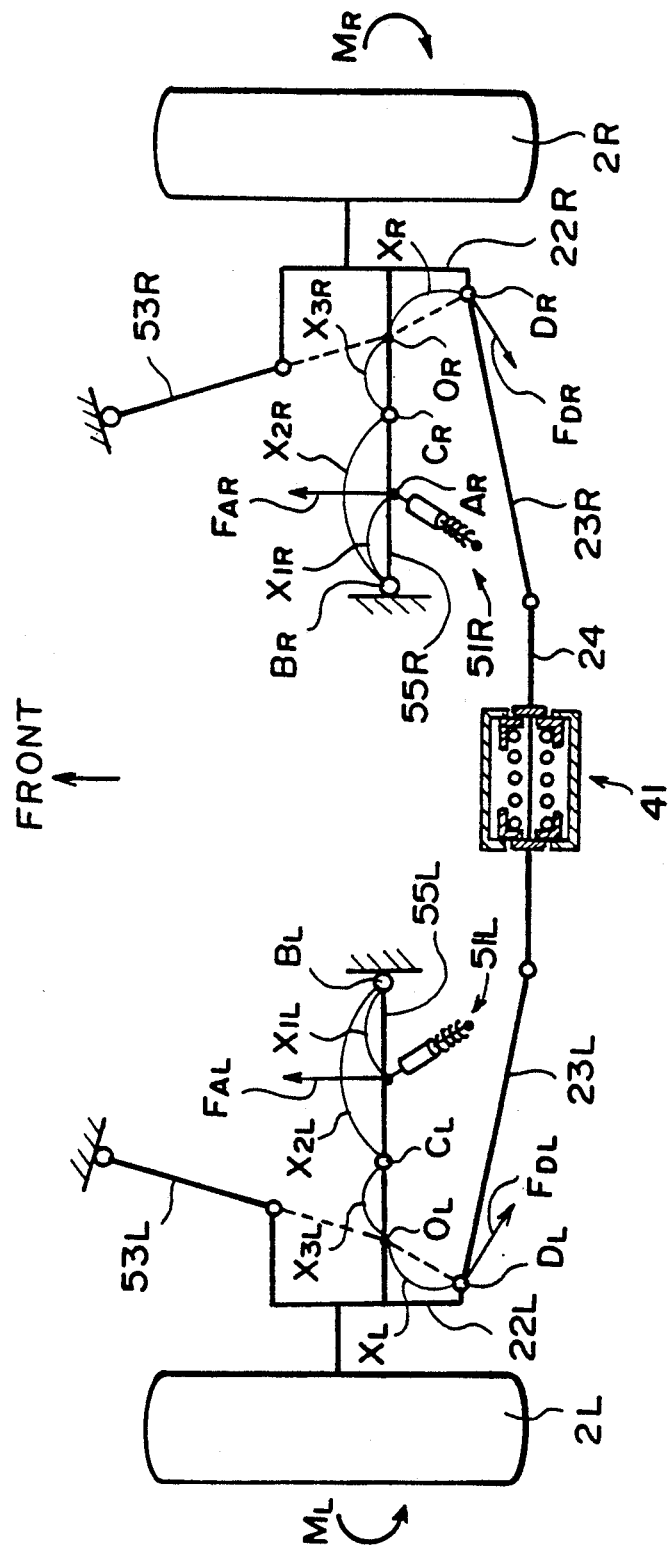
FIG. 5 is a view similar to FIG. 3 but showing a rear suspension system in accordance with a second embodiment of the present invention.

Another embodiment of the present invention will be described with reference to FIGS. 5 and 6 which are respectively similar to FIGS. 3 and 4.

The embodiment of this embodiment mainly differs from the preceding embodiment in that the members of each of the left and right rear suspensions are arranged so that the instantaneous center is positioned outward of the connection of the lower lateral link to the wheel support unlike the preceding embodiment where the instantaneous center is positioned inward of the connection of the lower lateral link to the wheel support. Thus in this embodiment, the moments $M_L$ and $M_R$ acting on the rear wheel supports 22L and 22R about the left and right instantaneous centers $O_L$ and $O_R$ under the forces $F_{AL}$ and $F_{AR}$ are both directed outward of the vehicle body and are represented by the following formulae.

$$M_L = (F_{AL} \times X_{1L} / X_{2L}) \times X_{3L} \tag{9}$$

$$M_R = (F_{AR} \times X_{1R} / X_{2R}) \times X_{3R} \tag{10}$$

Since the left and right rear suspensions are symmetrical to each other when the left and right rear wheels 2L and 2R are in the straight ahead position, the inward moments $M_L$ and $M_R$ are equal to each other in force and are directed in opposite directions so long as the forces $F_{AL}$ and $F_{AR}$ are equal to each other.

Figure 6:
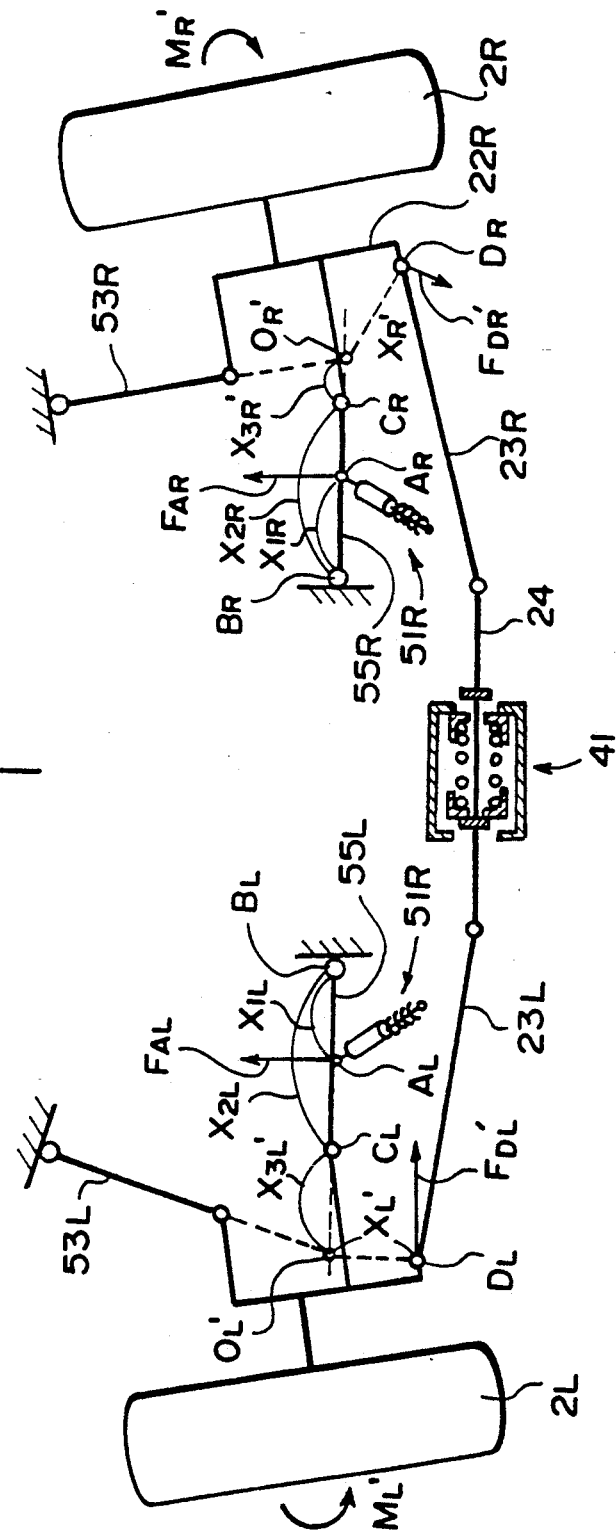
FIG. 6 is a view similar to FIG. 4 but showing the rear suspension system of the second embodiment.

As the left and right rear wheels 2L and 2R are turned left as shown in FIG. 6, the left and right instantaneous centers move leftward along the left and right lower lateral links 55L and 55R. On the side of the right rear wheel 2R which is the outer wheel, the distance between the connection $C_R$ of the lower lateral link 55R to the wheel support 22R and the right instantaneous center ($O_R \rightarrow O_R'$) decreases ($X_{3R} \rightarrow X_{3R}'$) and on the side of the left rear wheel 2L which is the inner wheel, the distance between the connection $C_L$ of the lower lateral link 55L to the wheel support 22L and the left instantaneous center ($O_L \rightarrow O_L'$) increases ($X_{3L} \rightarrow X_{3L}'$).

In the state shown in FIG. 6, the moments $M_L'$ and $M_R'$ acting on the rear wheel supports 22L and 22R about the instantaneous centers $O_L'$ and $O_R'$ under the force $F_{AL}$ and $F_{AR}$ can be represented by the following formulae.

$$M_L' = (F_{AR} \times X_{1L} / X_{2L}) \times X_{3L}' \tag{11}$$

$$M_R' = (F_{AR} \times X_{1R} / X_{2R}) \times X_{3R}' \tag{12}$$

Since the distance $X_{3R}'$ is smaller than the distance $X_{3R}$, the moment $M_R'$ when the rear wheels are in the turned state is smaller than the moment $M_R$ when the rear wheels are in the straight ahead position. On the other hand, since the distance $X_{3L}'$ is larger than the distance $X_{3L}$, the moment $M_L'$ when the rear wheels are in the turned state is larger than the moment $M_L$ when the rear Wheels are in the straight ahead position. Since the moment $M_R$ is equal to the moment $M_L$, the $M_R'$ is smaller than the moment $M_L'$. Accordingly when the moment in the direction of turn of the rear wheels is defined to be positive and the moment in the reverse direction is defined to be negative, the sum of the moments $M_R'$ and $M_L'$ is positive. When the sum of the moments $M_R'$ and $M_L'$ is positive, a force directed rightward acts on the relay rod 24 and assists the rear wheel turning mechanism B in turning the rear wheels leftward as in the preceding embodiment.

Figure 7:
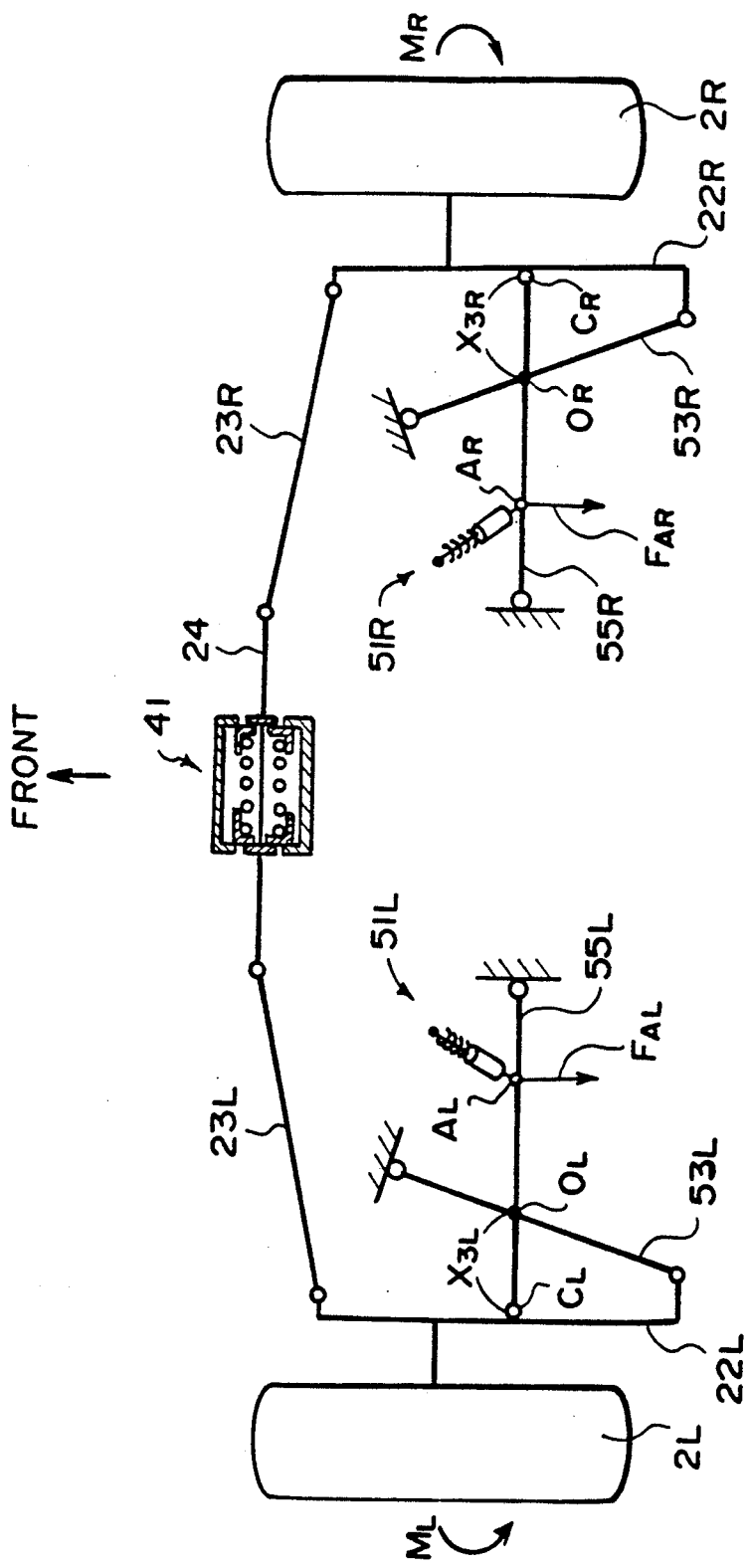
FIG. 7 is a view similar to FIG. 3 but showing a rear suspension system in accordance with a third embodiment of the present invention.

Still another embodiment of the present invention will be described with reference to FIGS. 7 and 8 which are respectively similar to FIGS. 3 and 4.

In each of the left and right rear suspensions of this embodiment, the lower lateral link (55L, 55R) and the lower trailing link (53L, 53R) cross with each other, and the damper (51L, 51R) is inclined with respect to the lower lateral link so that the connection ($A_L$, $A_R$) of the damper to the lower lateral link at the lower end thereof is positioned rearward of the connection thereof to the vehicle body at the upper end thereof. With this arrangement, the instantaneous center ($O_L$, $O_R$) is on the intersection of the lower lateral link and the lower trailing link and since the instantaneous center is inward of the connection ($C_L$, $C_R$) of the lower lateral link to the wheel support (22L, 22R), an outward moment ($M_L$, $M_R$) acts on each wheel support about the instantaneous center under a rearward component ($F_{AL}$, $F_{AR}$) of the force which acts on the lower lateral link from the damper.

Figure 8:
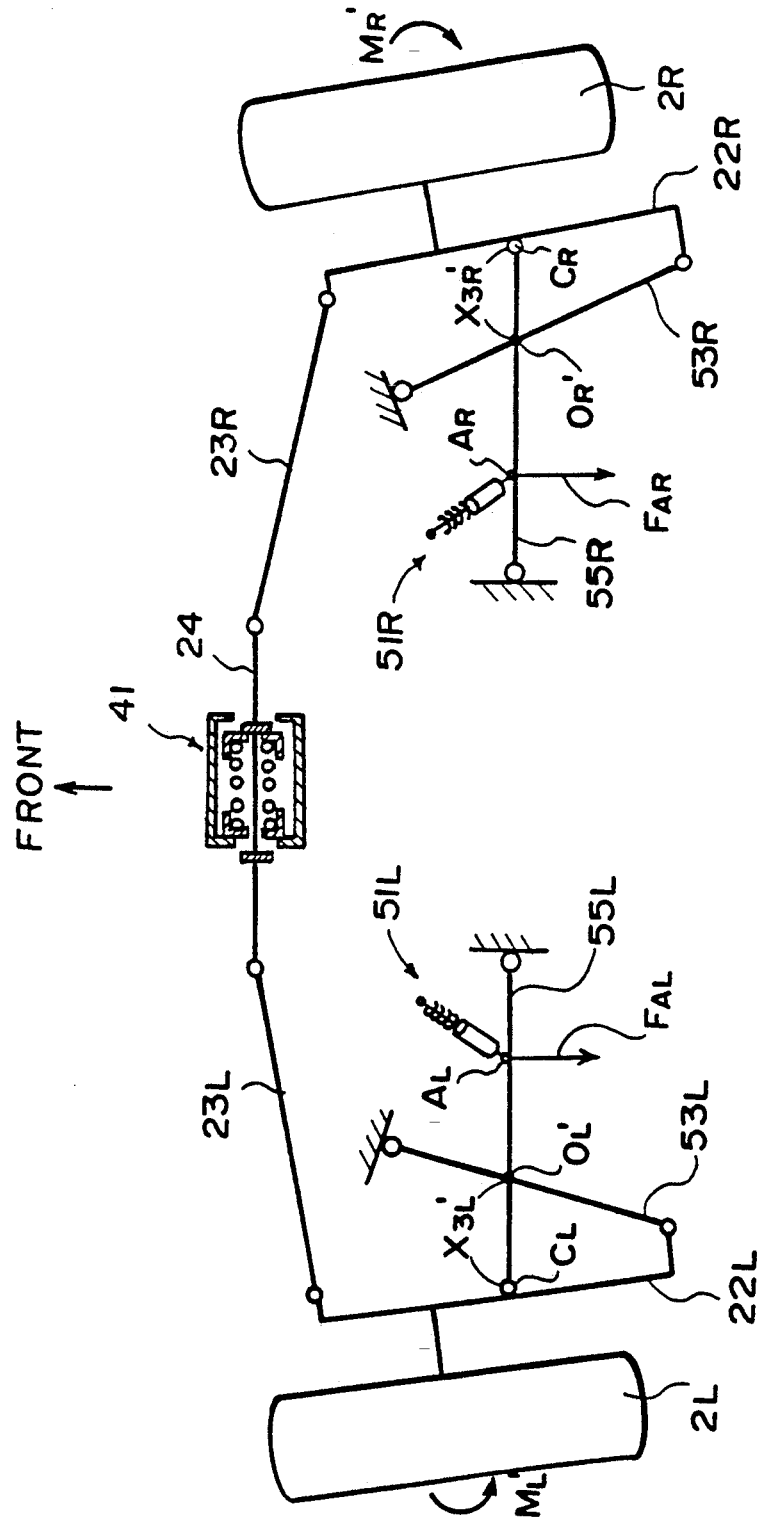
FIG. 8 is a view similar to FIG. 4 but showing the rear suspension system of the third embodiment.

When the rear wheels 2L and 2R are turned left as shown in FIG. 8, on the side of the left rear wheel 2L which is the inner wheel, the distance between the left instantaneous center ($O_L \rightarrow O_L'$) and the connection $C_L$ increases ($X_{3L} \rightarrow X_{3L}'$), whereby the outward moment acting on the left wheel support 22L increases ($M_L \rightarrow M_L'$). On the side of the right rear wheel 2R which is the outer wheel, the distance between the right instantaneous center ($O_R \rightarrow O_R'$) and the connection $C_R$ decreases ($X_{3R} \rightarrow X_{3R}'$), whereby the outward moment acting on the right wheel support 22R decreases ($M_R \rightarrow M_R'$). Accordingly, the sum of the moments $M_R'$ and $M_L'$ is positive as in the preceding embodiments and a force which assists the rear wheel turning mechanism B in turning the rear wheels acts on the relay rod 24.

Though the present invention has been described with respect to the rear wheel turning mechanism B which has a centering spring mechanism, the present invention can also be applied to rear wheel turning mechanisms having no centering spring.

What is claimed is:

1. A rear suspension system for supporting dirigible rear wheels of a vehicle having left and right rear wheel supports which respectively support the left and right rear wheels for rotation and a relay rod which connects the left and right wheel supports so that the rear wheel supports are turned in response to displacement of the relay rod in a transverse direction of the vehicle body, which rear suspension system consists of left and right rear suspensions each of which comprises first and second links which are connected for rotation to the rear wheel support in different positions at their outer ends and to the vehicle body in different positions at their inner ends and a damper which is connected to the vehicle body at its upper end and to the respective first link at its lower end;

wherein said dampers of the left and right rear suspensions are inclined to the corresponding first links so that they transmit force to the first links to generate moments about instantaneous centers of turn defined by an intersection of respective axis of the first links and respective axis of the second links of the respective rear wheel supports, the moments being substantially equal to each other and being directed in opposite directions when the rear wheels are held in the straight ahead position, and said first and second links are arranged so that the sum of the moments becomes positive as the rear wheels are turned when a moment in the direction of turn of the rear wheels is defined to be positive and a moment in the reverse direction is defined to be negative such that in each of the left and right rear suspensions, said first link extends substantially in the transverse direction of the vehicle body, the damper is inclined rearward so that the lower end thereof is positioned forward of the upper end thereof and said outer end of the first link at which the first link is connected to the wheel support is positioned outward of said instantaneous center, whereby an inward moment is generated about the instantaneous center under the force transmitted to the first link from the damper, and in each of the left and right rear suspensions, the links are arranged so that the instantaneous center moves leftward when the rear wheels are turned left and rightward when the rear wheels are turned right, whereby the distance between the outer end of the first link and the instantaneous center increases to increase the inward moment in the rear suspension for the outer wheel and decreases to reduce the inward moment in the rear suspension for the inner wheel when the rear wheels are turned.

2. A rear suspension system as defined in claim 1 in which said relay rod is provided with a centering spring mechanism which urges the relay rod toward the neutral position where it holds the rear wheels in the straight ahead position.

3. A rear suspension system as defined in claim 1 in which said force transmitted to the first link from the damper is a counterforce of a spring of the damper.

4. A rear suspension system for supporting dirigible rear wheels of a vehicle having left and right rear wheel supports which respectively support the left and right rear wheels for rotation and a relay rod which connects the left and right rear wheel supports so that the rear wheel supports are turned in response to displacement of the relay rod in a transverse direction of the vehicle body, which rear suspension system consists of left and right rear suspensions each of which comprises first and second links which are connected for rotation to the rear wheel supports in different positions at their outer ends and to the vehicle body in different positions at their inner ends and a damper which is connected to the vehicle body at its upper end and to the respective first link at its lower end;

wherein said dampers of the left and right rear suspensions are inclined to the corresponding first links so that they transmit force to the first links to generate moments about instantaneous centers of turn defined by an intersection of respective axis of the first links and respective axis of the second links of the respective rear wheel supports, the moments being substantially equal to each other and being directed in opposite directions when the rear wheels are held in the straight ahead position, and said first and second links are arranged so that the sum of the moments becomes positive as the rear wheels are turned when a moment in the direction of turn of the rear wheels is defined to be positive and a moment in the reverse direction is defined to be negative such that in each of the left and right rear suspensions, said first link extends substantially in the transverse direction of the vehicle body, the damper is inclined rearward so that the lower end thereof is positioned forward of the upper end thereof and said outer end of the first link at which the first link is connected to the wheel support is positioned inward of said instantaneous center, whereby an outward moment is generated about the instantaneous center under the force transmitted to the first link from the damper, and in each of the left and right rear suspensions, the links are arranged so that the instantaneous center moves leftward when the rear wheels are turned left and rightward when the rear wheels are turned right, whereby the distance between the outer end of the first link and the instantaneous center decreases to reduce the outward moment in the rear suspension for the outer wheel and increases to increase the outward moment in the rear suspension for the inner wheel when the rear wheels are turned.

5. A rear suspension system as defined in claim 4 in which said relay rod is provided with a centering spring mechanism which urges the relay rod toward the neutral position where it holds the rear wheels in the straight ahead position.

6. A rear suspension system as defined in claim 4 in which said force transmitted to the first link from the damper is a counterforce of a spring of the damper.

7. A rear suspension system for supporting dirigible rear wheels of a vehicle having left and right rear wheel supports which respectively support the left and right rear wheels for rotation and a relay rod which connects the left and right wheel supports so that the rear wheel supports are turned in response to displacement of the relay rod in a transverse direction of the vehicle body, which rear suspension system consists of left and right rear suspensions each of which comprises first and second links which are connected for rotation to the rear wheel support in different positions at their outer ends and to the vehicle body in different positions at their inner ends and a damper which is connected to the vehicle body at its upper end and to the respective first link at its lower end;

wherein said dampers of the left and right rear suspensions are inclined to the corresponding first links so that they transmit force to the first links to generate moments about instantaneous centers of turn defined by an intersection of respective axis of the first links and respective axis of the second links of the respective rear wheel supports, the moments being substantially equal to each other and being directed in opposite directions when the rear wheels are held in the straight ahead position, and said first and second links are arranged so that the sum of the moments becomes positive as the rear wheels are turned when a moment in the direction of turn of the rear wheels is defined to be positive and a moment in the reverse direction is defined to be negative such that in each of the left and right rear suspensions, said first link extends substantially in the transverse direction of the vehicle body, the damper is inclined rearward so that the lower end thereof is positioned forward of the upper end thereof and said outer end of the first link at which the first link is connected to the wheel support is positioned outward of said instantaneous center, whereby an outward moment is generated about the instantaneous center under the force transmitted to the first link from the damper, and in each of the left and right rear suspensions, the links are arranged so that the instantaneous center moves leftward when the rear wheels are turned left and leftward when the rear wheels are turned right, whereby the distance between the outer end of the first link and the instantaneous center decreases to reduce the outward moment in the rear suspension for the outer wheel and increases to increase the outward moment in the rear suspension for the inner wheel when the rear wheels are turned.

8. A rear suspension system as defined in claim 7 in which said relay rod is provided with a centering spring mechanism which urges the relay rod toward the neutral position where it holds the rear wheels in the straight ahead position.

9. A rear suspension system as defined in claim 7 in which said force transmitted to the first link from the damper is a counterforce of a spring of the damper.

* * * * *